United States Patent [19]
MacDonald et al.

[11] Patent Number: 5,751,454
[45] Date of Patent: May 12, 1998

[54] WAVELENGTH BYPASSED RING NETWORKS

[75] Inventors: R. Ian MacDonald, Edmonton; Herman W. Willemsen, Stittsville, both of Canada

[73] Assignee: Northern Telecom Limited, Montreal, Canada

[21] Appl. No.: 728,427

[22] Filed: Oct. 10, 1996

[51] Int. Cl.$^6$ .............. H04B 10/20; H04J 14/00
[52] U.S. Cl. .............. 359/119; 359/128; 359/110; 370/222
[58] Field of Search .............. 359/110, 119, 359/125, 128, 166; 370/222–223, 258, 412

[56] References Cited

U.S. PATENT DOCUMENTS

| | | | |
|---|---|---|---|
| 5,289,302 | 2/1994 | Eda | 359/123 |
| 5,406,401 | 4/1995 | Kremer | 359/119 |
| 5,548,431 | 8/1996 | Shin et al. | 359/119 |
| 5,647,035 | 7/1997 | Cadeddu et al. | 359/119 |

OTHER PUBLICATIONS

"Dense Wavelength Division Multiplexing Networks", C.A. Brackett, IEEE Journal on Selected Areas in Communications, vol. 8, No. 6, 1990, pp. 948–964.

"Terabit Lightwave Networks: Multihop Approach", A.S. Acampora et al., AT&T Technical Journal, Nov.–Dec. 1987, pp. 21–34.

The Lambdanet Multiwavelength Network: Architecture, Applications and Demonstrations, M. Goodman et al., IEEE Journal on Selected Areas in Communications, vol. 8, No. 6, 1990, pp. 995–1004.

"Performance Analysis of Multihop Lightwave Networks with Hot Potato Routing and Distance–Age Priorities", Z. Zhang et al., IEEE Transactions on Communications, vol. 42, No. 8, Aug. 1994, pp. 2571–2581.

Primary Examiner—Kinfe-Michael Negash
Attorney, Agent, or Firm—Aprilia U. Diaconescu

[57] ABSTRACT

The invention is directed to the use of wavelength channels to bypass nodes in ring networks. For networks with a small number of nodes, direct node to node routes are provided without changing the physical layout of the fibre in the ring. Architectures providing complete transparent interconnections with extra capacity for heavily used routes on a portion of the ring are disclosed. For networks with a large number of nodes, underconnected networks provide a number of accelerated, direct routes between some of the nodes. Proposed architectures for underconnected networks and methods for self-routing the traffic are also provided.

22 Claims, 11 Drawing Sheets

WAVELENGTH BYPASSED RING NETWORKS

BACKGROUND OF THE INVENTION

1. Field of the Invention

The invention relates to a wavelength bypassed ring network (WBRN), and more particularly to an access type network using fixed-route WDM channels in the links of relatively small-scale optical ring networks to provide both capacity expansion and routing.

2. Background Art

The rapid evolution of computer and telecommunication technology in the last years has made optical fiber one of the most succesful transmission media, due mostly to the high transmission rates and low error rate available with fiber. Driven by subscriber demand, network owners are currently deploying systems capable of supporting fiber for business and residential applications.

Many of the emerging telecommunication technologies are based on the idea of relaying traffic as quickly as possible. This idea is often called fast packet relay or fast packet switching. Generally, the packet networks are of two types: frame relay, transporting variable sized protocol data units (PDUs), and cell relay, transporting fixed length PDUs or cells. The cell comprises a 48 octet payload with a 5 octet header and is used, with slight variations, by both asynchronous transfer mode (ATM) and the Metropolitan Area Network (MAN) standard.

The synchronous optical network (SONET) standard defines the physical interface, optical line rates known as optical carriers (OC) signals, a frame format and an OA&M protocol. The user signals are converted into a standard electrical format called the synchronous transport signal (STS), which is the equivalent to the format of the optical signal (OC).

Access networks for data communication have lately improved in performance and were made more versatile for processing images, voice, data and other information, which need transmission capacities in excess of 100 Mbs. This trend resulted in an increased demand for access networks of higher speeds and higher throughputs.

Current access networks generally have a star, tree or mesh configuration. Ring topology is considered a cost-effective network architecture allowing bandwidth sharing and improved survivability in the event of span failure. Generally, a ring is formed with add/drop multiplexers (ADMs) which insert/extract traffic into/from a working and a protection fiber. However, self-healing rings have a fundamental limitation. Because both protection and transmission capacities are shared among nodes, traffic increase in a saturated ring can lead to replacement of transmission equipment at all nodes, with no smooth evolutionary path for the unexpected traffic increases. A solution is to use a plurality of channels on the same fiber, the channels being routed separately according to their wavelength, a technique termed wavelength division multiplexing (WDM).

WDM transmission can provide manifold capacity expansion on existing fiber links. Its potential for routing signals is equally important. By introducing WDM, the capacity of a ring can be increased in an efficient and cost-effective way with a 100% multiplex section protection, and with minimal changes to the nodes hardware or to the automatic switching protocol (ASP).

Networks using wavelength routing fall into two general types: single hop, which provide routes directly between nodes, and multihop, in which the units of information pass through intermediate nodes. Routes in single hop networks are equivalent to independent optical fiber paths, each route using a wavelength. In multihop networks, a signal on a route may be relayed through several nodes, a number of wavelengths being used in the process. Relaying nodes may perform a store and forward function implying optoelectronic conversion, or simply act as transparent crossconnects.

Single and multihop WDM network architectures have been studied, and articles entitled "Dense Wavelength Division Multiplexing Networks" by C. A Brackett, IEEE Journal on Selected Areas in Communications, Vol. 8, No. 6, 1990, pp. 948–964; and "Terabit Lightwave Networks: Multihop Approach" by A. S. Acampora et al., AT&T Technical Journal, Nov.–Dec. 1987, pp. 21–34, describe the results of such studies.

U.S. Pat. No. 5,289,302 (Masahiro Eda), issued Feb. 22, 1994 and assigned to NEC Corporation, discloses a local area network which uses wavelength multiple rings and one special channel (wavelength) for the token passing, and uses the wavelength to segregate the switched connections.

The majority of the work disclosed in the above papers and patent concern star or tree physical fiber layouts for single hop networks, and various mesh fiber layouts for multihop networks. While the physical deployment of fiber often takes the form of rings, there have been no WDM routing schemes specifically adapted to this topology.

SUMMARY OF THE INVENTION

It is an object of this invention to provide a bypassed wavelength ring network which eliminates totally or in part the disadvantages of the presently available single and multiple hop optical networks.

It is another object of this invention to provide a network architecture which uses fixed-route WDM channels in the links of relatively small-sized optical ring networks to provide both capacity expansion and routing. The wavelength channels are arranged so that some bypass each node and terminate further along the ring, in effect providing accelerated optical routes. Signals on bypass routes are not processed by intermediate nodes, reducing the overall equipment requirement.

Accordingly, the invention provides an optical wavelength bypassed ring network (WBRN) configured with a plurality (N) of traffic nodes and an optical fiber chaining from traffic node to traffic node in a ring configuration, a fiber span Sn for linking a node (n) with a downstream node (n+1), where n is the sequential position of the node (n) in the ring and $n \in [1,N]$, each node (n) comprising an input port for receiving a plurality ($Q_i$) of incoming channels, an output port for providing a plurality ($Q_o$) of outgoing channels, and bypass means for directly connecting an incoming channel having the carrier wavelength $\lambda_q$, to an outgoing channel of the same carrier wavelength $\lambda_q$, bypassing the node (n) whenever the node (n) is not the destination node for the incoming channel $q \in [1,Q]$.

The invention also provides a method for routing traffic in an optical ring network configured with a plurality (N) of traffic nodes and an optical fiber chaining from traffic node to traffic node in a ring configuration, a fiber span $S_n$ for linking a node (n) with a downstream node (n+1), where n is the sequential position of the node (n) in the ring and $n \in [1,N]$, the method comprising the steps of providing Q transmission channels along each fiber span $S_n$, each transmission channel having a distinct wavelength $\lambda_q$, where $Q=N(N-1)/2$ and $q\in[1,Q]$, assigning a subset (C) of transmission channels $\lambda_c$ to each node (n), such that $C=N-1$, at each node (n) providing (C) direct single-hop routes, a single-hop route (R) for connecting the node (n) to a destination node (p), the direct route (R) comprising one of a direct transmission channel $\lambda_c$ and a by-passing transmission channel $\lambda_c$, a by-passing transmission channel travelling transparently along all nodes along the section of the ring comprised between the node (n) and the destination node (p), where $p\in[1,N]$, and transporting a protocol data unit between any node (n) and any destination node (p) of the ring network using the single-hop route.

The invention further provides a method for routing traffic in an optical ring network configured with a plurality (N) of traffic nodes and an optical fiber chaining from traffic node to traffic node in a ring configuration, a fiber span $S_n$ for linking a node (n) with a downstream node (n+1), where n is the sequential position of the node (n) in the ring and $n\in[1,N]$, the method comprising the steps of selecting a subset (P) of destination nodes (p), where (p) takes sequential integer values from 1 to P, and $P<N-1$, providing Q transmission channels along each fiber span $S_n$, each transmission channel having a distinct wavelength $\lambda_q$, where $q\in[1,Q]$, assigning a subset (C) of transmission channels $\lambda_c$ to each node (n), such that $C<N-1$, at each node (n), providing (C) direct routes, a direct route (R) for connecting the node (n) to an intermediate node (j), the direct route (R) comprising one of a direct transmission channel $\lambda_c$ and a by-passing transmission channel $\lambda_c$, a by-passing transmission channel travelling transparently along all nodes along the section of the ring comprised between the node (n) and the intermediate node (j) and transporting a protocol data unit (PDU) between any node (n) and any destination node (p) using a plurality of direct routes.

A major advantage of the invention is the use of a ring topology which is considered a cost-effective network architecture, allowing bandwidth sharing and survivability. The WBRN according to this invention can accommodate large capacity transmission in the access networks, allowing for upgrading the existing fiber deployment by use of WDM technology.

Also, the use of WDM technology makes the WBRN very flexible in that it can accommodate various customer demands and offers interesting potential.

For small numbers of nodes, direct node to node routes can be provided without changing the physical layout of the fiber in the ring. An application might be the provision of complete transparent interconnection with extra capacity for heavily used routes on a portion of the ring. When the ring is part of a mesh network, trunk routes may thus be accommodated. The WBRN uses more wavelengths for full one-to-one interconnection than would a star configuration fiber layout, but this disadvantage is greatly reduced if the WDM capacity is to be flexibly allocated without a continuous requirement for full interconnectivity.

As the number of nodes grows too large to be fully connected by the number of wavelengths available, blocking could become an issue. Calculations showing the accumulation of blocked PDUs in the nodes indicate that for reasonable numbers of wavelengths, for example 20, approximately 10 nodes could be served. A solution to improving PDUs loss and latency is to use accelerated multihop routes for larger rings. The number of nodes possible in transparent multihop networks of the invention scales directly with the factor by which the data rate on the optical channels exceeds the data rate offered by the nodes. Advanced techniques to increase the channel data rate may be of use in the future to increase network size.

In store-and-forward WBRNs, self-routing is simple to implement and there is no need to communicate the establishment of routes back to the source node. The bypassing WDM connections reduce delay significantly in these networks.

In addition, the invention provides an effective way to use each available fiber bidirectionally. About 25 nodes could be supported on a bidirectional WBRN with a reasonable number of wavelengths, for example 20, using 20-cell buffers. Store-and-forward technique is promising for transmission at data rates compatible with active, electronic routing, and therefore for upgrades to existing fiber rings without introducing new optical technology.

BRIEF DESCRIPTION OF THE DRAWINGS

The foregoing and other objects, features and advantages of the invention will be apparent from the following more particular description of the preferred embodiments, as illustrated in the appended drawings, where.

DESCRIPTION OF THE PREFERRED EMBODIMENT

Figure 1A:
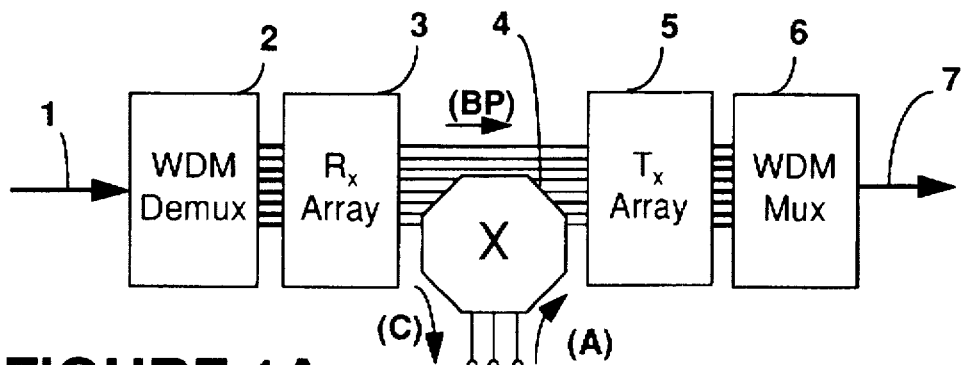
FIG. 1A shows an electronic switched node for a wavelength bypassed ring network (WBRN)
Figure 1B:
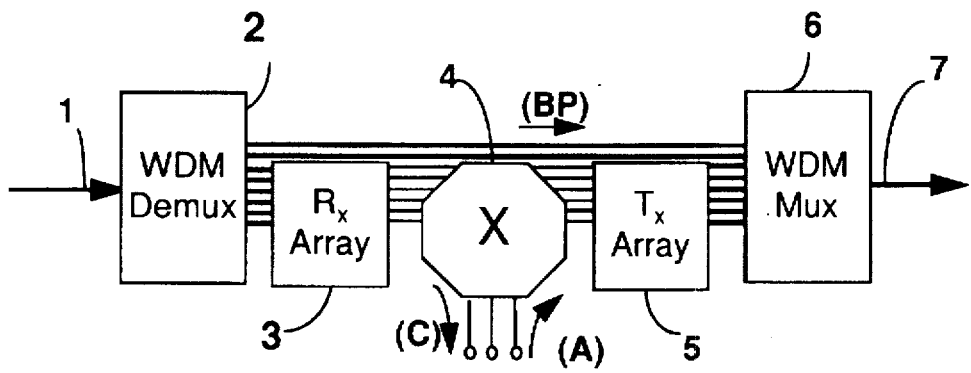
FIG. 1B shows an optical/electronic switched node for a WBRN.
Figure 1C:
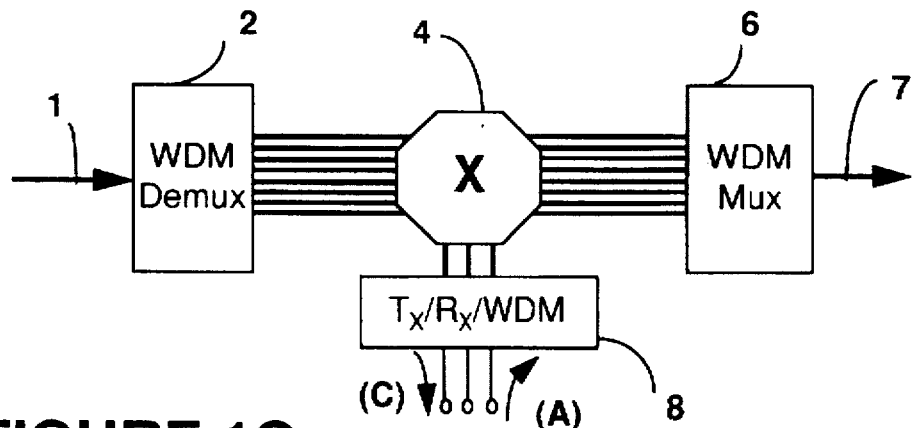
FIG. 1C shows an optically switched node for a WBRN.

Routing through a node may be fully optical, or optoelectronic conversion may occur between wavelength demultiplexing and multiplexing operations. FIGS. 1A to 1C illustrate the block diagrams for various types of nodes according to the routing type. A detailed electrical schematic of the WBRN nodes is not provided therein, as it is not the object of the invention. The hardware and software design of WBRN nodes depend on the traffic protocol. As noted above, the WBRN may be used with any type of traffic, such as fixed length PDUs (ATM and MAN cells) and variable length PDUs. In FIGS. 1A, 1B and 1C the optical signals are illustrated using thicker lines than the lines illustrating the electrical signals.

FIG. 1A shows an electronic bypass node, wherein the incoming optical signals 1 are demultiplexed according to their wavelength in demultiplexer 2, and the resulting optical signals are applied to receiver array 3, one receiver for a wavelength. The $R_x$ array also converts the optical signals to electrical signals. Some of the electrical signals are terminated at the node (C), others, designated here (BP), pass directly to a transmitter array 5 which produces a set of optical carriers of different wavelengths at the output side of the node. Signals (A) originating at the node are combined with these bypassing channels (BP). Routing is achieved by the crossconnect switch 4 which places signals (A) on the transmitter emitting the wavelength leading to the desired destination. Switch 4 may also be used to allocate channels to bypass the node. The optical signals output by transmitters 5 are multiplexed in multiplexer 6 to form the outgoing WDM set 7.

FIG. 1B shows an optical bypass node for a WBRN, wherein only the signals (C) addressed to the respective node are converted to electrical signals, while the bypass traffic (BP) is optically connected to the output side of the node unaltered.

Optical transparency is possible if the crossconnect 4 is an optical switch. FIG. 1C shows an optically switched bypass node for a WBRN, wherein switch 4 effects optical switching of demultiplexed optical signals (C) and (BP), and also switches traffic (A) added at the node. In this embodiment, only signals (C) are converted to electrical signals in transmitter/receiver block 8, which also converts the electrical signals (A) received at the node to optical signals.

Although individual channel rates may be restricted by comparison with the potential performance of transparent optical channels, the optoelectronic conversion shown in the nodes of FIGS. 1A and 1B has advantages. It allows for electronic switching and storage, the reassignment of wavelengths on the bypassing channels, and gives access to information carried by the signals. On the other hand, the potential bandwidth advantage of all-optical channels may be difficult to realize in practice and the active use of WDM channels for routing requires wavelength selective optical switching components or tunable transmitters and receivers. Such devices pose a difficult development challenge, but they may become available in the future.

Switches 4 of the types shown in FIGS. 1A to 1C may be used for the control of the bypass arrangements in a WBRN giving the means to allocate link capacity in the network.

The network architectures of the invention involve nodes connected in a ring configuration, wherein fixed route WDM channels, travelling on a single fiber, bypass a number of nodes. The ring may be fully connected, overconnected or underconnected, depending on the number of nodes, the volume of traffic between particular nodes, and other design parameters.

(a) Fully Connected, Single Hop WBRNs

Fully connected networks are defined to be those that provide a single wavelength channel leading directly from every node to each of the others. In a fully connected network, there are enough wavelength channels on each link that a direct, single hop path is available from each node to every other. Preferably, the same number (Q) of wavelengths is present on each fiber span. Such a network is illustrated in FIG. 2, where only the connections for node A are illustrated.

Figure 2:
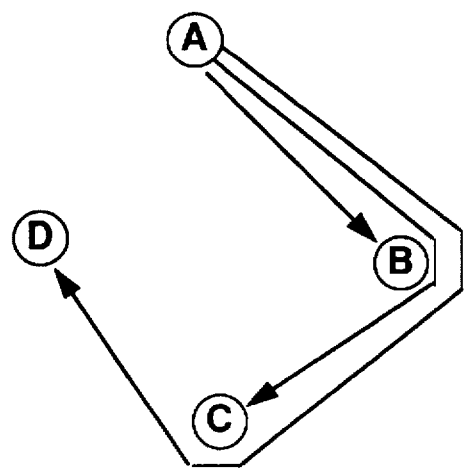
FIG. 2 is a bypass pattern for a fully connected WBRN with four nodes and six wavelengths/fiber span.

For full connection of the four nodes (N=4) in FIG. 2, a total of six wavelengths (Q=6) is required, as can be seen by counting the number of channels on each fiber span, after rotating the pattern shown for node A to all remaining nodes B, C and D. Each node has three wavelength channels terminating on it (C=3).

In the general case of N nodes, the nodes can be fully connected with an appropriate arrangement of N links, and the number Q of wavelengths is given by the equation:

$$Q[N] = \frac{N(N-1)}{2} \tag{1}$$

For comparison, $N^2$ wavelengths are required in a star network to provide full connectivity, without coordinating wavelength assignment among the nodes. Brackett has pointed out in the above-identified article "Dense Wavelength Division Multiplexing Networks" that only N wavelengths are required in a star network if the wavelengths are assigned with global coordination, in other words, if the wavelength assignment to each receiving node permute cyclically at each successive source node.

This number is approximately $N^2/2$ for the fully connected WBRN (see equation (1)) and is therefore intermediate between the situation for star networks with or without global coordination of wavelength assignments.

As seen from equation (1), Q grows rapidly with network size. However, for small ring networks, dense WDM technology can provide large enough values of Q for full connection. A 32-wavelength star-topology system has been demonstrated in "The LAMBDANET Multiwavelength Network: Architecture, Applications and Demonstrations", M. Goodman et al., IEEE Journal on Selected Areas in Communications, Vol. 8, No. 6, 1990, pp. 995–1004. This number is sufficient for a fully connected eighth-node ring, (Q[8]=28).

(b) Overconnected single hop WBRNs

Figure 3:
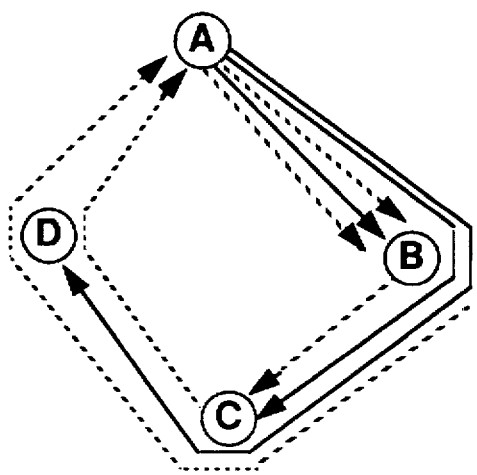
FIG. 3 is a bypass pattern for an over-connected WBRN with four nodes and eighth wavelengths/fiber span, showing overconnection by two routes per fiber span.

When there are more than Q wavelengths available on each link, the WBRN is "overconnected". A fully connected WBRN could be provided with extra capacity on some routes. Such a network architecture is shown in FIG. 3. If the bypass configuration is controllable by the crossconnect switch as illustrated in FIGS. 1A to 1C at each node, the extra channels can be located where they are required, and could alternatively be used to establish special dedicated connections in response to customer demand.

The "overconnections" may add to the full connection capability, in which case the normal operation of an overconnected network is not affected by the extra connections. Because channels are separated by wavelength, it is possible to maintain a variety of transmission formats simultaneously, for example SONET, among all nodes and another standard between certain users. Format insensitivity, or "transparency", is expected to be an important advantage in the provision of dedicated wideband channels.

While the WBRN uses more WDM channels than a star architecture to achieve a fixed, fully connected single-hop network with a given number of nodes, this disadvantage is reduced in overconnected networks, because the global wavelength assignment scheme for the star network functions less effectively. Obviously, to provide R simultaneous channels between any two nodes, at least R wavelengths are needed with either network. Provided R>Q, there is no distinction between star and WBRN architectures as to the number of wavelengths required.

The connections that can be achieved with a unidirectional overconnected WBRN can be determined as in the example given in FIG. 3 and Table 1. In FIG. 3, only the connections for node A are shown for simplification; the pattern is repeated for nodes B, C and D. The additional connections are illustrated in dotted lines. In the example of FIG. 3, two extra channels are accommodated on each fiber span, such that Q increases from Q=6, used in the fully connected WBRN with four nodes shown in FIG. 2, to Q=8. The number of channels going from each node to every other is given in Table 1 for a four-node network.

shown in FIG. 3. Pattern (b) is not cyclic in nature and therefore provides a multihop WBRN. This is because no direct connection is provided from node A to D, from node B to D and from node D to A. This configuration may be used, for example, if there is little traffic between these nodes of the network. Note that while node B does not transfer any traffic to node D, there is a connection from node D to node B, which illustrates the flexibility of these types of networks. However, a non-cyclic WBRN cannot benefit from self-routing, which is generally employed with cyclic WBRNs, and especially with underconnected WBRNs, as it will be shown later.

TABLE 2

Some of the possible connection patterns in an overconnected network: N = 4, Q = 8

| FROM | TO | | | |
|------|---|---|---|---|
|      | A | B | C | D |
| A    | 0 | 3 | 1 | 1 |
| B    | 2 | 0 | 2 | 1 |
| C    | 2 | 1 | 0 | 1 |
| D    | 1 | 1 | 1 | 0 |
| Pattern (a): (1, 1), (2, 1), (1, 2), (1, 1) | | | | |
| A    | 0 | 3 | 1 | 0 |
| B    | 3 | 0 | 3 | 0 |
| C    | 1 | 2 | 0 | 2 |
| D    | 0 | 1 | 1 | 0 |
| Pattern (b): (0, 1), (3, 0), (2, 1), (1, 1) | | | | |

In the above examples Q=8, which means that there are two additional wavelengths compared to the fully connected four-node configuration of FIG. 2. The notation in brackets shows the corresponding bypass arrangement. The first number represents wavelength channels launched from each

TABLE 1

Configuration procedure for an overconnected unidirectional network

|  | A | B | C | D | A |
|---|---|---|---|---|---|
| bypass | A to D | B to A | C to B | D to C | A to D |
| next 2 | a | c | e | g | a |
| bypass | A to C | B to D | C to A | D to B | A to C, D |
| next 1 | h | b | d | f | h |
| links occupied by previous bypass | Bypass A from C, D e + f + g | Bypass B from D, A g + h + a | Bypass C from A, B a + b + c | Bypass D from B, C c + d + e | Bypass A from C, D e + f + g |
| next node | N– (a + h + e + f + g) | N– (c + b + g + h + a) | N– (e + d + a + b + c) | N– (g + f + c + d + e) | N– (a + h + e + f + g) |

The entries in each column of the table are the number of channels originating at a node, organized according to which subsequent node they terminate on. Bypassing channels are represented in the appropriate subsequent columns. For example, the channels that leave node A and bypass node B or C have table entries in the third row. The column totals represent the number of wavelength channels exiting each node, and cannot exceed Q. This total is made up of the channels originating at a node plus the channels that bypass the node.

Table 2 shows two different connectivity states that can be achieved in a four node WBRN with eight wavelengths (Q=8). Pattern (a) is cyclic in nature, providing a single hop WBRN with 8 wavelengths (Q=8) on each fiber span, as node to bypass the next two nodes; the second number represents channels that bypass the next node. If implemented in a single hop star with global wavelength coordination, pattern (a) would require only 5 wavelengths, while pattern (b) would require seven wavelengths.

(c) Underconnected WBRNs

When the WBRN has more than 8 nodes, current and foreseeable WDM technology cannot accommodate a sufficient number of channels for full interconnection. In underconnected networks, the WDM paths lead from each node to a subset of the others. Fixed wavelength-bypass arrangements are used to provide multihop bypass routes which use fewer hops than would be necessary without the bypass, and thus reduce the overall requirement for traffic routing and transmission. Such networks are shown in FIGS. 4A and 4B.

Figure 4A:
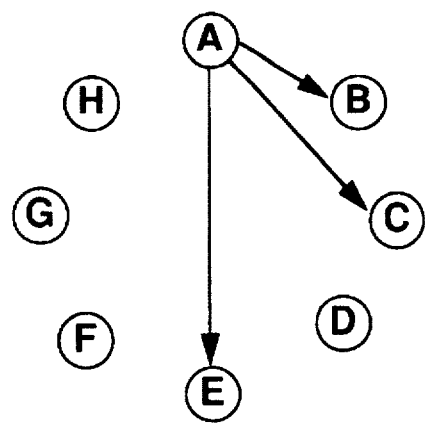
FIG. 4A is a binary bypass pattern for an underconnected WBRN with eight nodes and seven wavelengths/fiber span.
Figure 4B:
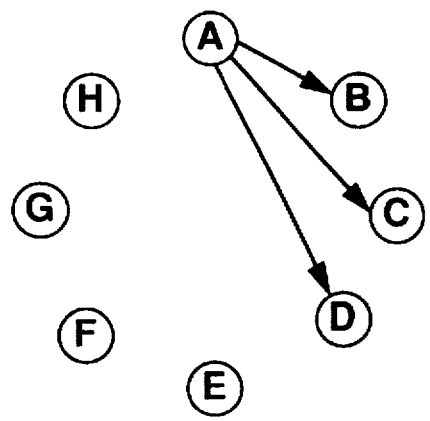
FIG. 4B illustrates a linear bypass pattern for an underconnected, unidirectional WBRN, with eight nodes and six wavelengths/fiber span.

FIG. 4A shows an example of a network configuration termed "binary", which uses seven wavelengths (Q=7) to provide a link from each node to the next, second and fourth node around the ring. Only the WDM connections originating from a single node are shown; the other nodes of the ring repeat the same pattern. Each node has three wavelength channels terminating on it (C=3). This network provides C=$\log_2$(N) direct connections, the $j^{th}$ connection terminating on the $2(j-1)^{th}$ adjacent node downstream. All the physical connections follow the route of the ring on single fibers chaining from node to node. These patterns follow the ring in a single sense only, so that transmission on every link is unidirectional. With this simple scheme, very good cell-loss performance can be obtained in ring networks up to about 20 nodes.

A variety of bypass connections are possible. An additional pattern is illustrated in FIG. 4B. The pattern shown in FIG. 4B, designated "linear", consists of a single link from the originating node to each of the next three adjacent nodes.

In cyclic underconnected WBRNs, the number C of paths that terminate on each node is equal to the number of paths originating at the node. The patterns shown in FIGS. 4A and 4B have the number of node terminations and number of wavelengths shown in Table 3. C must be distinguished from the total number Q of wavelengths used on the WDM links.

TABLE 3

Node terminations (C) and WDM channels (Q) required for the underconnected WBRNs of FIGS. 4A and 4B

| Pattern | C | Q |
|---------|---|---|
| binary  | 3 | 7 |
| linear  | 3 | 6 |

Self-routing schemes for cyclic WBRNs

Because of the cyclic nature of the WBRN, self-routing schemes may be elaborated and analyzed. If we identify the nodes by enumerating their sequential position around the ring, a "route index" (RI) can be calculated for each PDU by subtracting the addresses of the source and destination nodes. Self-routing is accomplished by selecting any route which bypasses fewer nodes than the route index and subtracting the actual number of nodes bypassed on that link from the route index. If the destination is previous to the source, N is first added to the route index. PDU delivery is accomplished when the route index (expressed modulo the number of nodes) goes to zero. In such a system, the links are not orthogonal. Unlike a hypercube routing scheme, for example, a PDU may need to travel more than once along a link of a particular length. There is a benefit to this property; it implies that the routing method can be used with bypass patterns in which more than one link of a particular length emanates from a node.

There are two ways to employ this self-routing scheme. In one, complete multihop routes are established from source to final destination, as for example disclosed in the article "Performance analysis of multihop lightwave networks with hot potato routing and distance-age priorities" by Zhang et al., IEEE Transactions on Communications, Vol. 42, No. 8, Aug. 1994, pp. 2571-2581. Such routes can be transparent; no address processing is required once they are established. The other method is to buffer PDUs electronically after each single hop, in a store-and-forward arrangement. While this method is limited to transmission rates that allow electronic processing of every PDU, the parallelism of WDM transmission and the accelerated routes offered by wavelength bypassing lead to much enhanced performance for upgrades of existing fiber ring networks with existing WDM technology.

1. Transparent Multihop WBRNs

Figure 5:
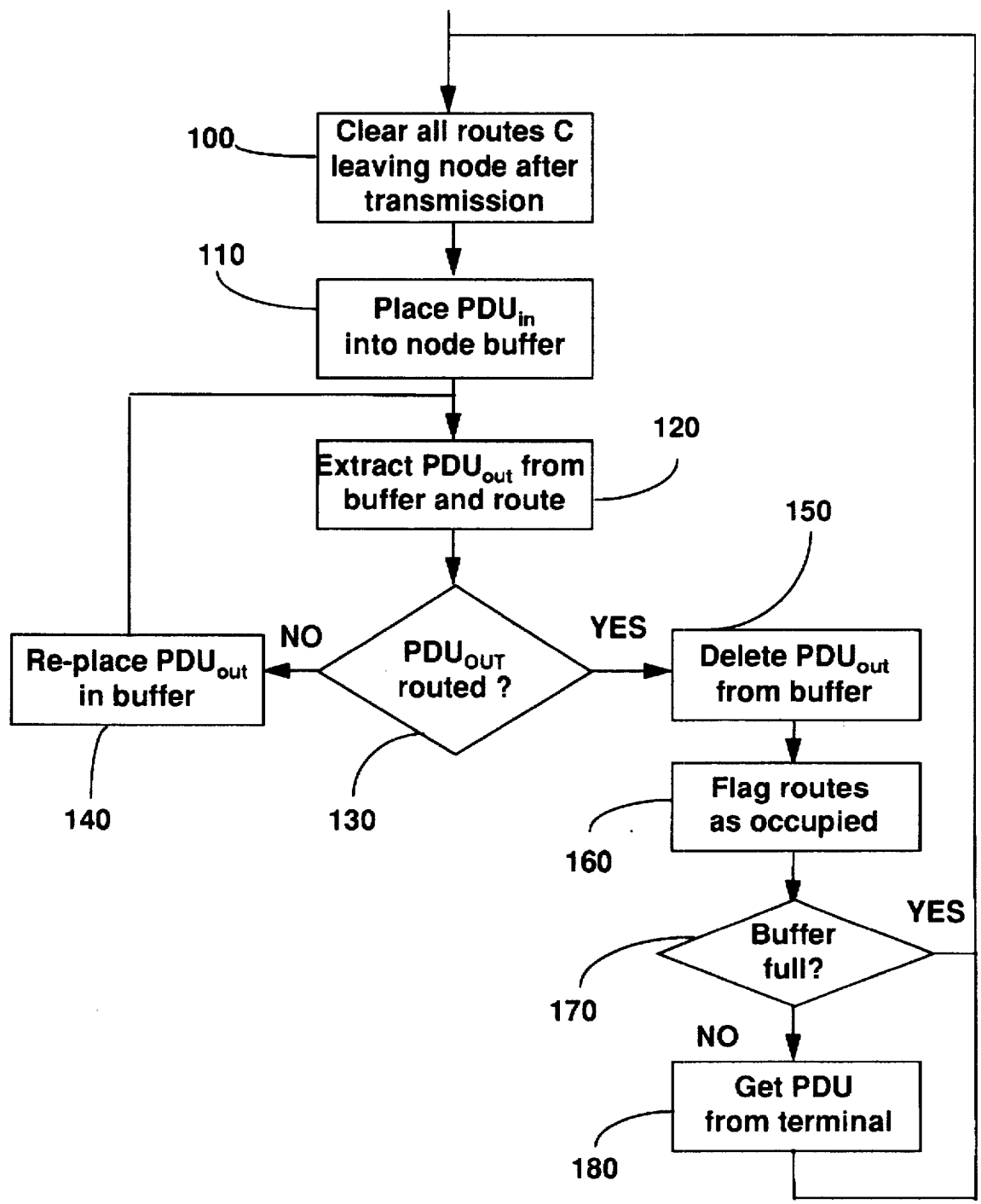
FIG. 5 is a flowchart of a self-routing method employed by the nodes of a transparent multihop WBRN.

A simple model for the self routing in transparent multihop networks according to this invention is illustrated in FIG. 5. In step 100, all previously established routes (C) originating from a node (A, for example) are cleared at the completion of PDU transmission. In step 110, one new $PDU_{in}$ is placed into node A's buffer representing an input from the terminals attached to node A. In step 120, all PDUs in the buffer are extracted one by one in random order, and an attempt is made to route each to its destination via a multihop connection. If the connection can be made without collision, as determined in step 130, the PDU is erased from the source node buffer in step 150 and the links used are flagged as occupied in step 160. If the PDU cannot be routed, the PDU is reinserted in the source buffer in step 140. A new PDU is accepted from the node terminal in step 180 if the buffer is not full, as determined in step 170. The process then repeats and the same procedure is applied simultaneously and asynchronously at each node of the network.

The transparent multihop network would operate most efficiently if many PDUs can be transmitted once a link has been established, for example by maintaining separate buffers in each node, sorted by destination. For the purposes of modelling, such a procedure is equivalent to lengthening the PDUs, and does not change the results.

PDUs are not dropped once accepted by a node; they are lost only when the buffer at a node is full and cannot accept a PDU presented to it by the tributary.

An estimate can be made of the buffer length and of the limit on the number of nodes in the network, set by buffer overflow. Given a WBRN configuration in which each node has C outgoing and C incoming channels terminating on it, the probability $p_b$ of placing a PDU in the buffer at a node is the probability that it cannot find a route out of the node because PDUs already following multihop routes in the network take priority on the outgoing connections. The probability $p_s$ that a PDU launched from a previous node will not require a hop at the node under consideration is simply the ratio of the number of addresses between the two nodes to the total number of possible addresses.

$$p_s = \frac{s-1}{N-1} \quad (2)$$

where s−1 is the number of nodes between the source node from the node under consideration. The probability $p_h$ that no arriving PDU requires an exit route must include the contributions from all nodes in the network:

$$p_h = \prod_{s=1}^{N-1} p_s \quad (3)$$

The probability that a hop does occur is $(1-p_h)$. If there are C exit routes, then the probability that all are used is:

$$p_b = (1-p_h)^C \quad (4)$$

The probability that a new PDU can find a free route and escape the node buffer is $p_c$. If there are C routes possible, the total probability of n routes out of the C available being free simultaneously is:

$$p_n = \frac{C!}{(C-n)!n!} \, pc^n \quad (5)$$

The probability of n and only n routes being free is:

$$P_n = p_c^n - p_c^{n+1} \quad (6)$$

The rate of extracting PDUs from the buffer is thus $$\sum_{n=1}^{C} n \cdot p_n.$$

The network is stable only if the buffer filling rate is less than the buffer emptying rate, and may be written as:

$$p_b \leq \sum_{n=1}^{C} n \cdot p_n \quad (7)$$

The probabilities $p_b$ and $p_n$ depend on the number (N) of nodes and the number (C) of wavelength channels that terminate on each node, but not on the particular arrangement of bypass. Accordingly, the results shown next were obtained with various patterns of underconnected WBRNs.

Figure 6A:
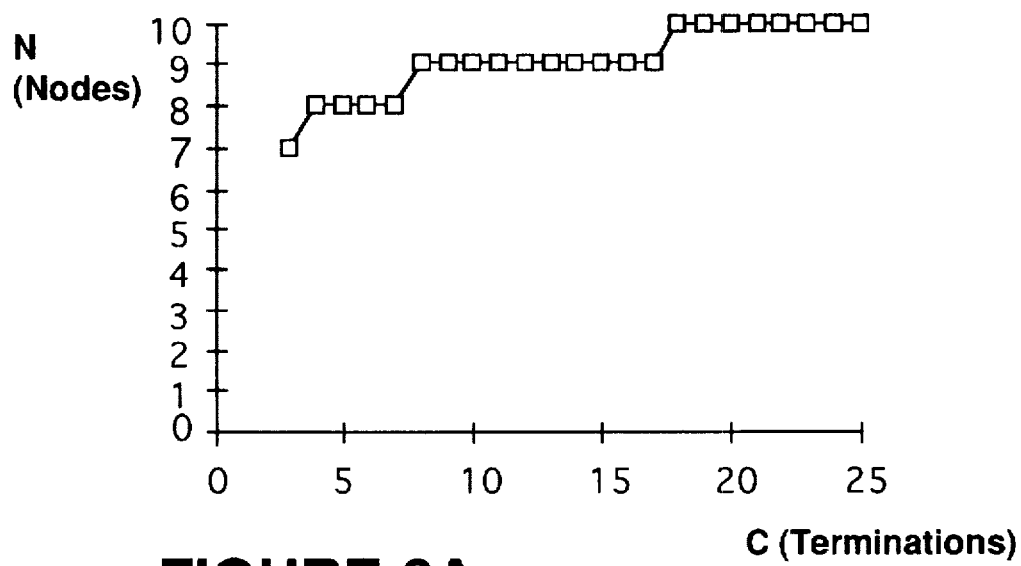
FIG. 6A is a graph showing the maximum number of nodes for a transparent multihop network as a function of the number of node terminations (C), which is same as the number of wavelengths (Q)

In FIG. 6A, the number of nodes $N_{max}$ that can be supported in a transparent multihop WBRN is shown as a function of the number of node terminations C. The graph illustrates a zero-bypass pattern for which C=Q. Networks up to nine nodes can have more nodes than wavelengths, and thus use the wavelength channels more efficiently than star networks. However, this efficiency drops rapidly for larger networks. The number of nodes is limited to about 10 with available WDM technology.

Figure 6B:
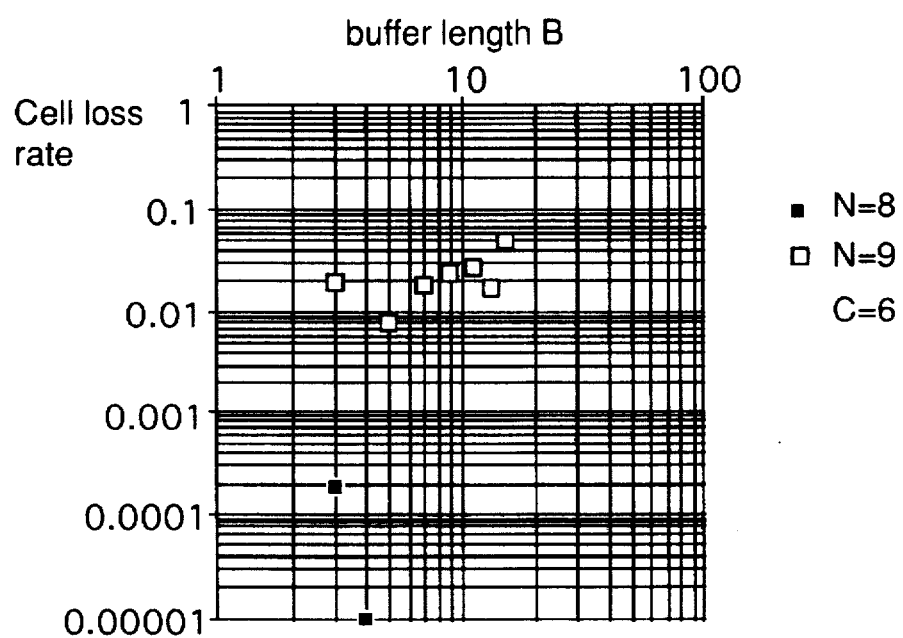
FIG. 6B shows the cell loss rate as a function of the buffer length (B) for a transparent multihop WBRN, for eight and nine node terminations.

In FIG. 6B cell loss rate is presented as a function of buffer length B for a WBRN with C=6. The zero-bypass configuration is used again. The loss rate is computed as the ratio of the total number of delivered cells to the total number generated by all the nodes. The loss rate decreases with the buffer size for an 8-node WBRN. Buffer size determines loss rate when the buffers fill only occasionally. Loss rate remains high for N=9 and is independent of the buffer size, indicating that the rate of buffer injection is higher than the rate of extraction, and the buffers are always full. From FIG. 6A, it can be seen that $N_{max}=8$ nodes is indeed the predicted limit for C=6.

Figure 6C:
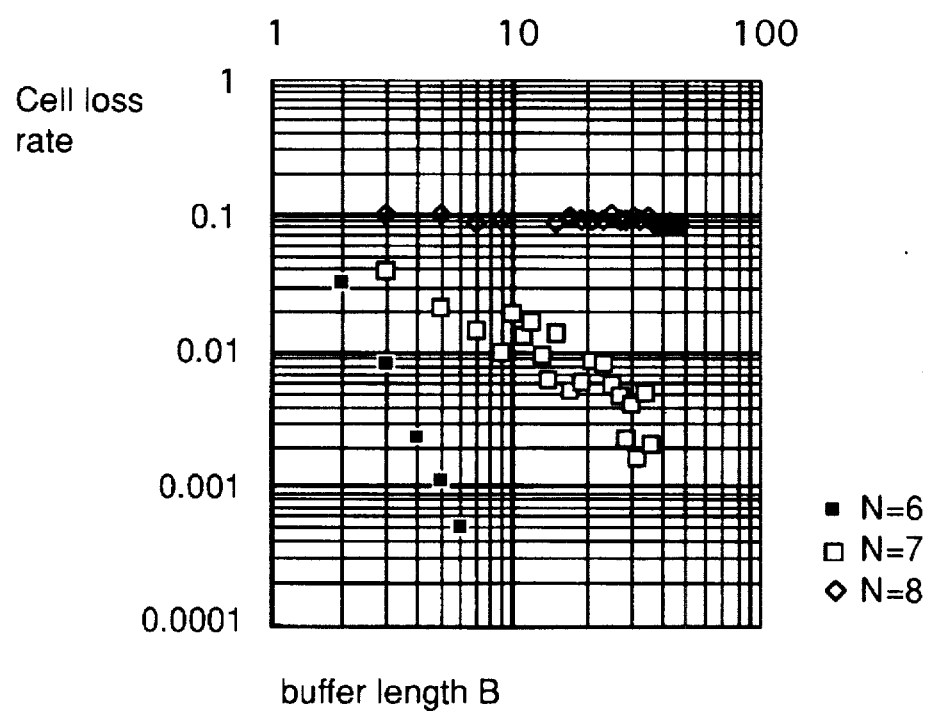
FIG. 6C shows the cell loss rate as a function of buffer length for a linear transparent multihop WBRN, for N=6, 7 and 8.

FIG. 6C illustrates the cell loss rates for the linear network configuration of FIG. 4B, with 6, 7 and 8 nodes. The loss rate decreases with buffer length for WBRNs with N=6 and N=7, but is unaffected for N=8 nodes. The limit $N_{max}=7$ for C=3 is in agreement with FIG. 6A.

The problem of blocking in transparent multihop networks has been noted by Zhang et al. in an article entitled "Performance Analysis of Multihop Lightwave Networks with Hot Potato Routing and Distance-Age-Priorities", IEEE Transactions on Communications, Vol. 42, No. 8, Aug. 1994, and the suggestion made is that the very high data rates possible on optical channels could provide sufficient capacity to compensate for the problem by retransmission. Increasing the WDM channel rate while keeping the offered traffic constant will increase $N_{max}$ proportionally. Such accelerations require optical techniques for generating higher speed signals than can be accomplished electronically.

2. Store-and-forward Multihop WBRN

An alternative to the transparent multihop strategy with end-to-end routes is to carry PDUs as far as possible toward their destination and buffer them if they arrive at intermediate nodes from which no exit route is available. This approach abandons the guarantee of high capacity transparent paths, but also has advantages. For example, blocking is reduced and no path confirmation information is needed by the sending node, so that self-routing is possible for each PDU. Bypassed network configurations such as shown in FIGS. 4B and 4A may become advantageous because they provide fixed transparent routes in the network that eliminate some of the requirement for handling traffic in the nodes.

Figure 7:
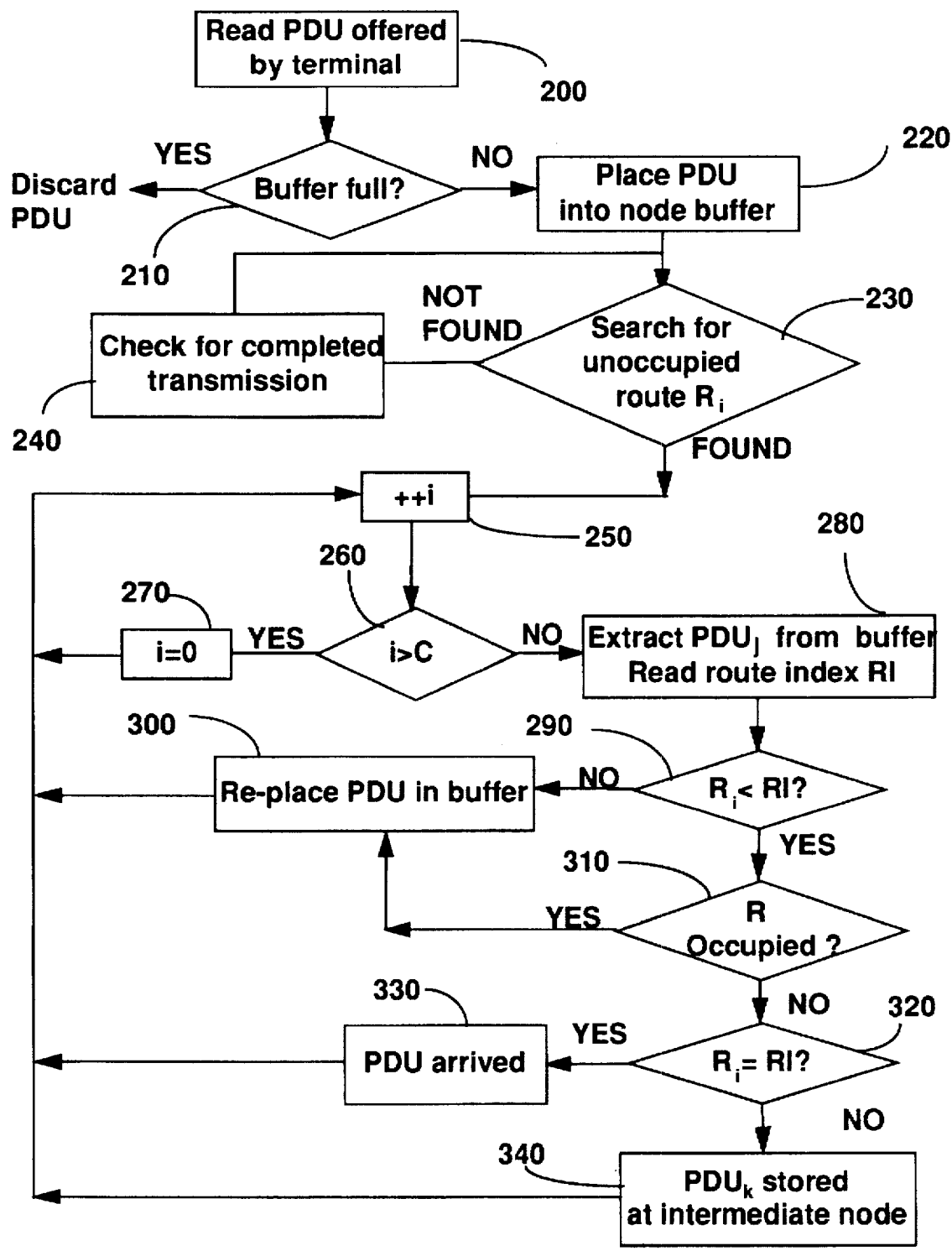
FIG. 7 is a flow chart of a self-routing method employed by the nodes of a store-and-forward WBRN.

A routing scheme for a store-and-forward WBRN is illustrated in FIG. 7. In step 200, a PDU is read at a node (A for example), the node checks if the buffer is full in step 210 and if yes, the PDU is discarded. If the buffer is not full, the PDU is placed into the buffer in step 220. In steps 230 and 240, the node searches an unoccupied route $R_i$ by checking for completed transmissions. When a route $R_i$ is found, the route index (i) is advanced in step 250 and in step 260 it is determined if the index is greater than the number (C) of routes originating in node A. If yes, (i) is reset in step 270, and steps 250 and 260 are repeated. If i<C, a $PDU_k$ is extracted from the node buffer in step 280, and the route index (RI) for this $PDU_k$ is read from the node buffer. If the length of route $R_i$ is less than (RI) as determined in step 290, the $PDU_k$ is reinserted in the buffer in step 300 and route index is advanced, etc. Steps 250 to 300 are repeated until a route $R_i$ of equal or greater length than the route index (RI) is found. Next, if route $R_i$ is not occupied, as determined in step 310, and R=RI in step 320, the $PDU_k$ is transferred to the destination node and the scheme returns control to step 250 for routing another PDU. If route $R_i$ is occupied, the $PDU_k$ is reinserted in the buffer and another route is searched for, as shown in steps 250 to 310. If the answer to the question in step 320 is negative, this means that the route index $R_i$ is greater than RI, the PDU is transported and stored at an intermediate node in step 340, and the control is returned to step 250 for routing another PDU.

An estimate can be made for the buffer size needed to avoid overflow for a store-and-forward WBRN with a linear configuration, such as shown in FIG. 4B. The probability of immediate delivery of a PDU to its destination is the ratio of the number of different routes C originating on each node to the number of possible addresses (N−1). The proportion of cells passing through a node which enter the relaying process is therefore (N−1−C)/(N−1). With an offered load of one PDU per unit time at each of the N nodes, the overall PDU generation rate is N. The total number of PDUs that have been buffered in N nodes in the steady state is:

$$N \times N \times \sum_{j=1}^{\infty} \left\{ \frac{N-1-C}{N-1} \right\}^j \quad (8)$$

The network must be able to accommodate the total number of stored PDUs in the steady state. Using the approximation that stored PDUs are uniformly distributed among the nodes, the required buffer length B at each node is $$B = \frac{N^2 - N \times (C+1)}{C} \quad (9)$$

Figure 8:
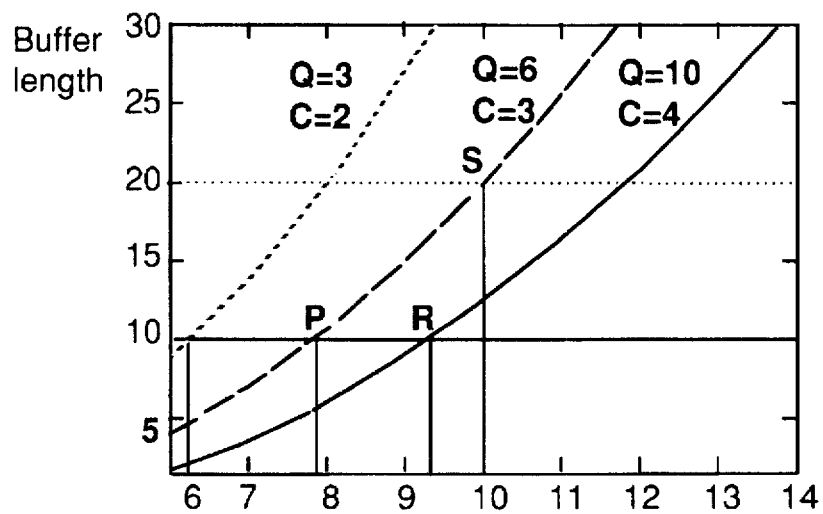
FIG. 8 illustrates the buffer length requirement for a store-and-forward linear configuration as a function of the number of nodes, for C=2, 3 and 4.

The buffer requirement is plotted as a function of the number of nodes in FIG. 8 for WBRN architectures with C=2, C=3 and C=4. The lines at B=10 and B=20 are included for reference to simulation results given below. Comparing FIGS. 6A and 8 reveals that for B=10 and for equal numbers of wavelength channels Q, the limiting number of nodes is about the same for transparent multihop networks without bypass and store-and-forward networks with the linear bypass configuration. Thus, FIG. 6A shows a maximum of N=7 for C=3, and a maximum of N=8 for C=4; FIG. 8 also shows a maximum of N=7 and N=8 nodes in points P and R.

The limit on the transparent multihop network, however, is set by blocking, rather than buffer size. The store-and-forward networks can be made larger by increasing the lengths of the buffers.

In the following simulations, $10^5$ cells were generated with a uniform distribution of addresses and routed through "linear" and "binary" networks with similar WDM and electronic requirements. The measures of network performance calculated are the cell loss rate and the latency, which is the average number of times cells are placed in a node buffer en route. The "linear" network used six wavelengths (Q=6), while the "binary" network required seven wavelengths (Q=7).

Figure 9A:
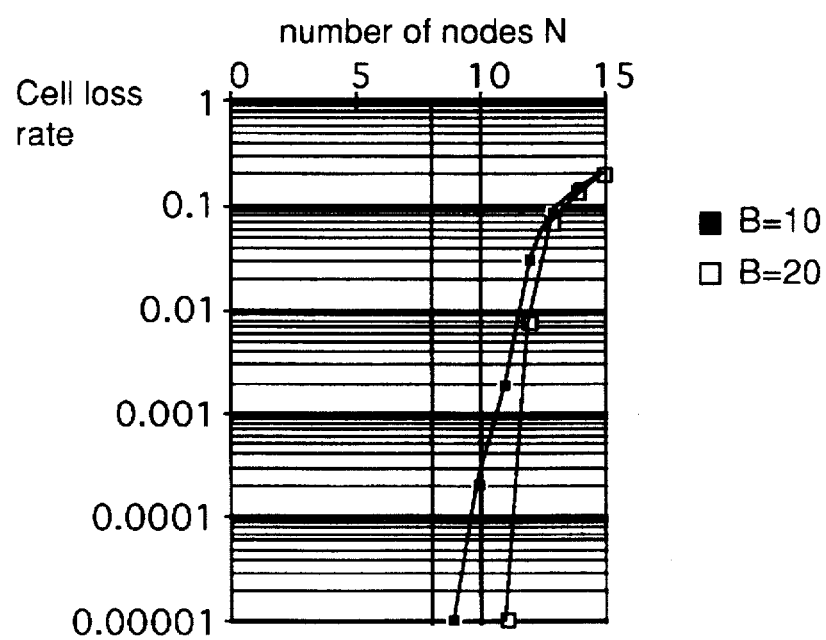
FIG. 9A is a graph showing the cell loss rate as a function of the number of nodes N for a store-and-forward linear configuration with Q=6, C=3, for B=10 and 20 PDUs.

In FIG. 9A, cell loss calculations are plotted as a function of the number of nodes for store and forward WBRNs in the "linear" configuration, with C=3 and buffer lengths of 10 and 20 cells. The maximum number of nodes $N_{max}$=8 and 10 for these buffer lengths are indicated on the plot by the vertical lines. When the number of nodes exceeds $N_{max}$, the cell loss rate degrades rapidly with network size, confirming the calculations leading to FIG. 8.

Figure 9B:
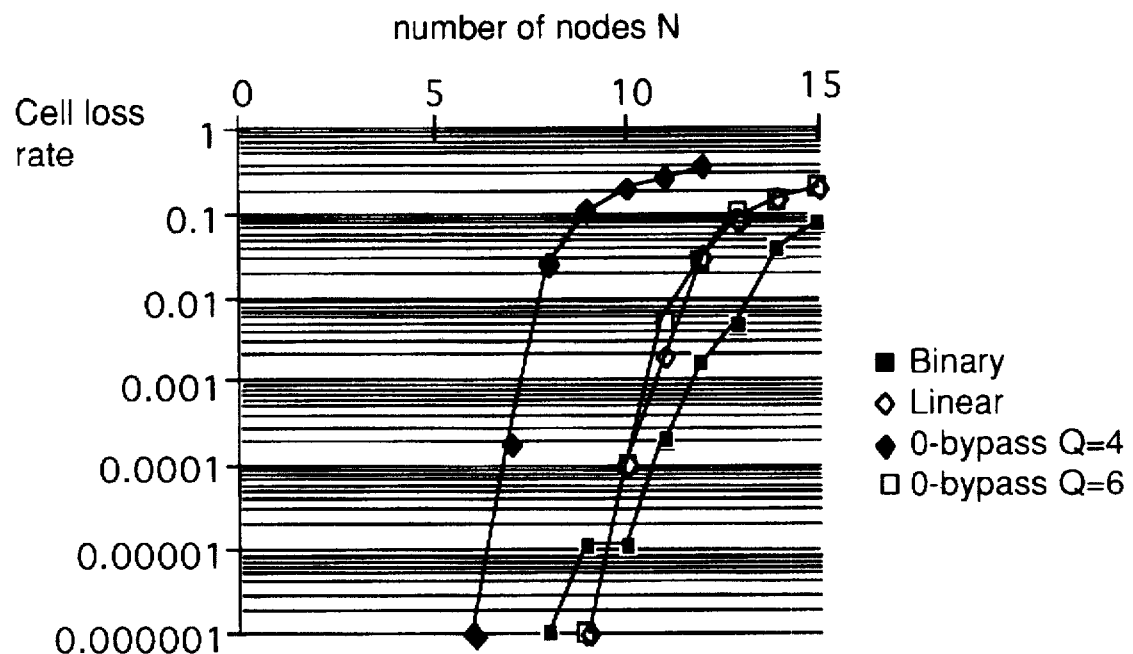
FIG. 9B shows the cell loss rate as a function of the number of nodes N for a binary network with Q=7, C=3, a linear network with Q=6, C=3, and two 0-bypass networks with Q=6 and Q=4, respectively.

Cell loss rates of linear and binary networks are shown in FIG. 9B, with all buffers set to a length of 10. The linear system is as in FIG. 9A; the binary pattern uses Q=7, C=3. In all cases, thresholds exist in the number of nodes beyond which performance degenerates rapidly. Best performance is obtained with the binary arrangement over the range shown. Irregularities are present in these curves, particularly for the binary WBRN. This phenomenon is discussed next in connection with bidirectional networks.

Figure 9C:
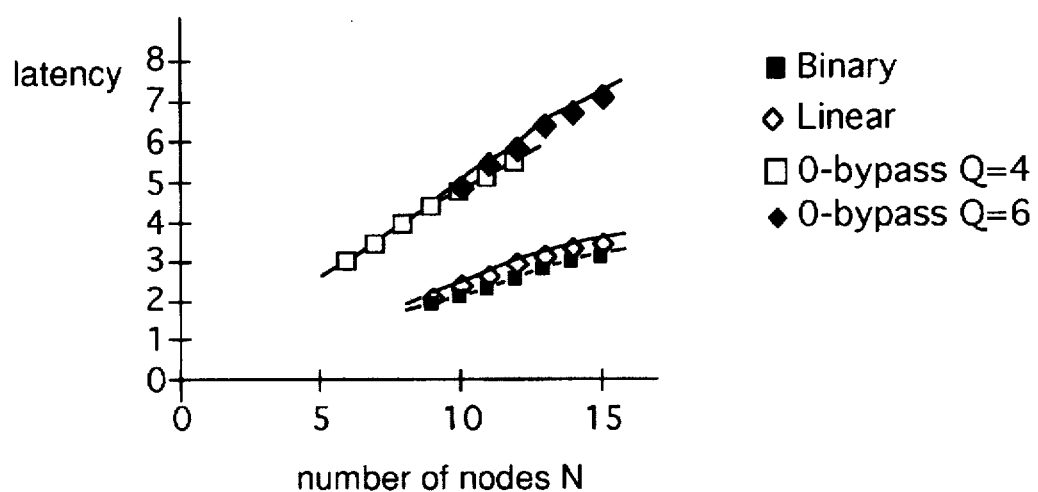
FIG. 9C illustrates the latency as a function of the number of nodes N for a binary network with Q=7, C=3, a linear network with Q=6, C=3, and two 0-bypass networks with Q=4 and Q=6, respectively.

The accelerated bypass routes in the linear network are expected to decrease latency by comparison with the zero-bypass network. The latency values shown in FIG. 9C for the same linear, binary and zero-order networks as in FIG. 9B, confirm this expectation.

(d) Bidirectional Transmission on WBRN

Figure 10A:
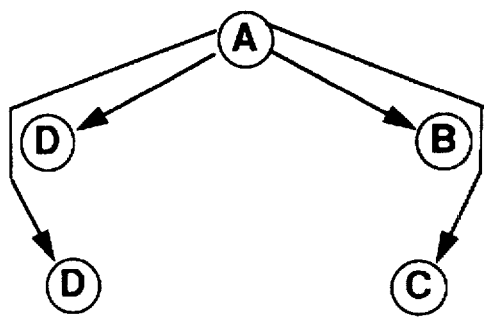
FIG. 10A shows a linear bypass pattern for an underconnected, bidirectional WBRN, with five nodes and seven wavelengths/fiber span.

Bidirectional transmission is also possible on the links of the WBRN. While bidirectional transmission may present difficulties, for example in optical amplified systems, it increases the number of nodes that can be accommodated in a fully connected network, for a given number of wavelengths. The basic connection pattern for a five node (N=5) fully connected WBRN with bi-directional transmission is shown in FIG. 10A. When this pattern is repeated at each node, a total of 6 independent channels is required on each span, counting both directions. Thus, one more node can be accommodated than in the unidirectional WBRN of FIG. 2. In general, the number $Q_b$ of wavelengths required in a fully connected bidirectional WBRN of N nodes is:

$$Q_b = \frac{N^2 - 1}{4} \quad (10)$$

where N is an odd number. While the number of wavelengths required still grows as the square of N, small networks need relatively few wavelengths.

Overconnected bidirectional WBRNs can provide more connections than star networks with the same number of wavelength channels. Table 4 shows a connection pattern that can be set up in a bidirectional WBRN of four nodes, using eight wavelengths ($Q_b$=8). The same connectivity scheme can be achieved in a star network with coordinated wavelengths using nine wavelength channels.

TABLE 4

A connection pattern in an overconnected bidirectional network: N = 4, $Q_b$ = 8

| FROM | TO | | | |
|------|----|----|----|----|
|      | A | B | C | D |
| A | 0 | 3 | 1 | 4 |
| B | 3 | 0 | 3 | 0 |
| C | 1 | 2 | 0 | 2 |
| D | 4 | 1 | 1 | 0 |

Figure 10B:
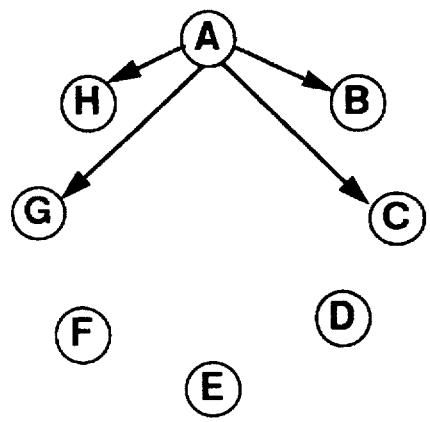
FIG. 10B shows a linear bypass pattern for an underconnected bidirectional WBRN, with eight nodes and six wavelengths/fiber span.

The underconnected WBRNs can be operated with bidirectional single fiber spans by using some of the available wavelengths in each direction, taking advantage of wavelength selection to provide both channel isolation and directional isolation. FIG. 10B illustrates n eight-node WBRN with bidirectional transmission. The pattern shown requires Q=6 wavelengths and connects each node to the two previous and the two subsequent, denoted C=4, or (+2,−2). The network could be considered to have either the "binary" or "linear" form in both directions.

Essentially, the same routing scheme can be used for the bidirectional network as for the unidirectional network. The backward connections to the $s^{th}$ previous node may be treated as if they were forward connections to the $(N-s)^{th}$ node, since the scheme is concerned with the logical, not the physical route taken. One change, however, needs to be made. In the unidirectional scheme, the longest possible route consistent with the route index is sought first. This procedure means that undeflected cells will approach their targets by shorter and shorter steps from a single direction. If they are on the wrong side of the target, they must go round the whole network. The scheme is altered for bidirectional networks so that routes in the reverse direction are sought for cells with RIs greater than N/2.

Figure 11A:
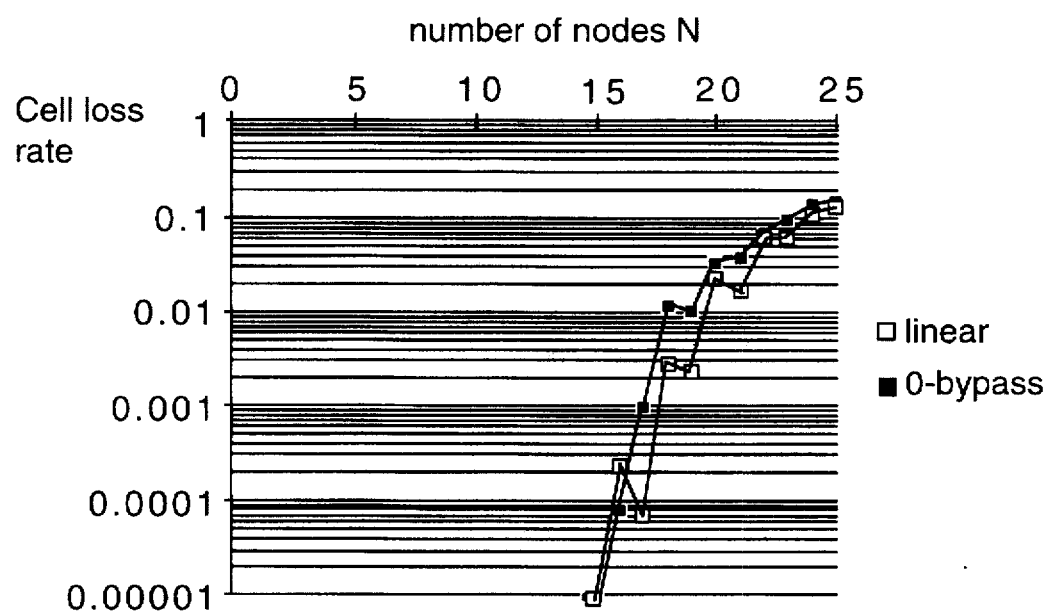
FIG. 11A is a graph illustrating the cell loss rate in bidirectional WBRNs with Q=6, linear configuration with C=(+2,−2) and 0-bypass configuration with C=(+3,−3)

Performance is enhanced by comparison with the unidirectional network. FIG. 8 shows that a maximum of 9 nodes would be expected for a unidirectional linear network with C=4, and 10-cell buffers. Such a network would require Q=10 wavelengths. FIG. 11A shows cell loss calculations for a bidirectional network with Q=6 and C=(+2,−2). The total number of connections at each node is C=4, but fewer wavelengths are needed to achieve this than in the unidirectional configuration. The predicted limit of 9 nodes is not observed; rather, the bidirectional network works well up to about 14 nodes.

The performance enhancement can be understood by viewing each direction as an independent network with half the number of nodes. The maximum number of nodes for a linear WBRN with C=2 can be seen from FIG. 8 to be 6 nodes. The observed performance of the bidirectional network is a somewhat better than double this value. Overall bidirectional WBRNs offer two advantages: larger numbers of node connections C for a given number of wavelengths Q, and larger numbers of nodes supported for a given number of node connections.

The irregularities observed in the curves is a result of harmonic relations between the bypass connections and the number of nodes in the ring. For example, the longest connection in the linear bypass arrangement goes from one node to the second node along the ring in either direction. When the ring contains an even number of nodes, the longest routes cannot by themselves yield a route to half the possible destinations, thus reducing the effective connectivity. The cell loss rate is correspondingly elevated somewhat for WBRNs with even numbers of nodes.

FIG. 11A also shows that, similar to unidirectional networks, the presence of bypass connections improves cell delay performance.

Figure 11B:
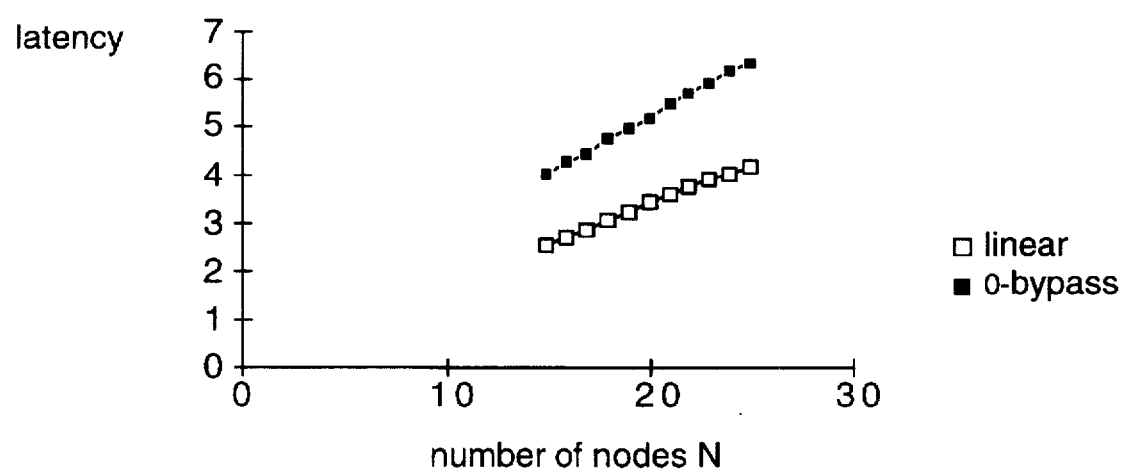
FIG. 11B is a graph illustrating the latency in a bidirectional WBRN with Q=6, for a linear configuration with C=(+2,−2) and a 0-bypass configuration with C=(+3,−3).

FIG. 11B shows the latency in a bidirectional linear configuration with C=(+2,−2), and a zero bypass configuration with C=(+3,−3). Comparing FIG. 11B with FIG. 9C, it is apparent that latency is lower for bidirectional than for unidirectional networks with the same number of nodes.

While the invention has been described with reference to particular example embodiments, further modifications and improvements which will occur to those skilled in the art, may be made within the purview of the appended claims, without departing from the scope of the invention in its broader aspect.

What is claimed is:

1. An optical wavelength bypassed ring network (WBRN) configured with a plurality (N) of traffic nodes and a transmission medium chaining from traffic node to traffic node in a ring configuration, a span $S_n$ of said transmission medium for linking a node (n) with a downstream node (n+1), where n is the sequential position of said node (n) in said ring and n∈[1, N], each said node (n) comprising:

an input port for receiving a first set of ($Q_i$) incoming channels;

an output port for providing a second set of ($Q_o$) outgoing channels; and bypass means for directly connecting an incoming channel of said first set having the carrier wavelength $\lambda_q$, where q∈[1, Q], to an outgoing channel of said second set, having same carrier wavelength $\lambda_q$, for bypassing said node (n) whenever said node (n) is not the destination node for said incoming channel.

2. A WBRN as claimed in claim 1, wherein the traffic is unidirectional.

3. A WBRN as claimed in claim 2, wherein ($Q_i$)=($Q_o$)=Q to provide a cyclic network.

4. A WBRN as claimed in claim 3, wherein each said node (n) is directly connected to each of the (N−1) remaining nodes along a direct route, for providing a single-hop fully connected ring network with $$Q = \frac{N(N-1)}{2}$$

transmission channels on each fiber span $S_n$.

5. A WBRN as claimed in claim 2, wherein each said node (n) is directly connected to each of the (N−1) remaining nodes, and further connected to a node (n+f) by (m) additional transmission channels, for providing a single hop overconnected ring network with (Q+m) transmission channels on all (f) spans $S_n, S_{n+1}, \ldots S_{n+f}$ between said node (n) and said node (n+1), where f∈[1, N] and (m) is an integer ≥1.

6. A WBRN as claimed in claim 2, wherein each node (n) is connected to a subset (P) of destination nodes (p), where (p) takes sequential integer values from 1 to P, and 2<P< (N−1).

7. A WBRN as claimed in claim 6, wherein ($Q_i$)=($Q_o$)=Q for providing a cyclic multi-hop underconnected ring network.

8. A WBRN as claimed in claim 7, wherein each said destination node (p) of said subset has a binary determined sequential position (2P).

9. A WBRN as claimed in claim 7, wherein each said destination node (p) of said subset has a linearly determined sequential position.

10. A WBRN as claimed in claim 1, wherein said bypass means comprises one of an electronic, optoelectronic or optical switch for routing said incoming channel of wavelength $\lambda_q$ transparently through said node from said input port to said output port.

11. A WBRN as claimed in claim 1, wherein the number of nodes (N) is between 3 and 8 and the number of channels (Q) on a span is between 3 and 28.

12. A WBRN as claimed in claim 1, wherein the traffic is bidirectional.

13. A WBRN as claimed in claim 12, wherein N is an odd number, and each node (n) is connected to each of the (N−1) remaining nodes, for providing a single-hop fully connected ring network with $$Q = \frac{N^2 - 1}{2}$$

transmission channels on each fiber span $S_n$.

14. A method for routing traffic in an optical ring network configured with a plurality (N) of traffic nodes and a transmission medium connecting said traffic nodes in a ring configuration, a span $S_n$ of said transmission medium for linking a node (n) with a downstream node (n+1), where n is the sequential position of said node (n) in said ring and n∈[1,N], said method comprising the steps of:

determining the number of channels necessary for connecting all nodes of said WBRN to each other;

providing Q transmission channels along each span $S_n$, each transmission channel having a distinct wavelength $\lambda_q$, where Q=N(N−1)/2 and q∈[1,Q];

assigning a first subset (C) of transmission channels $\lambda_c$ to each said node (n), that terminate at said node, such that C=N−1;

at each node (n) adding a second subset of (C) direct single-hop routes, a direct route (R) for connecting said node (n) to a destination node (p) identified by the wavelength $\lambda_c$, said direct route (R) comprising one of a direct transmission channel and a by-passing transmission channel, a by-passing transmission channel travelling transparently through all nodes along the section of said ring comprised between said node (n) and said destination node (p), where p∈[1,N]; and transporting a protocol data unit between any node (n) and any destination node (p) of said ring network using said single-hop route.

15. A method as claimed in claim 14, wherein said step of assigning a subset (C) of transmission channels $\lambda_c$ to each said node (n) further comprises providing (m) additional channels between said node (n) and a selected destination node (f) to obtain a single-hop overconnected ring network with (Q+m) transmission channels on all spans $S_n, S_{n+1}, \ldots S_{n+f}$ between said node (n) and said destination node (f), where f∈ and (m) is an integer ≥1.

16. A method for routing traffic in an optical ring network configured with a plurality (N) of traffic nodes and an optical fiber chaining from traffic node to traffic node in a ring configuration, a fiber span $S_n$ for linking a node (n) with a downstream node (n+1), where n is the sequential position of said node (n) in said ring and n∈[1,N], said method comprising the steps of:

selecting a subset (P) of destination nodes (p), where (p) takes sequential integer values from 1 to P, and P<N−1;

providing Q transmission channels along each fiber span $S_n$, each transmission channel having a distinct wavelength $\lambda_q$, where q∈ [1,Q];

assigning a subset (C) of transmission channels $\lambda_c$ to each said node (n), such that C<N−1;

at each node (n), providing (C) direct routes, a direct route (R) for connecting said node (n) to an intermediate node (j), said direct route (R) comprising one of a direct transmission channel $\lambda_c$ and a by-passing transmission channel $\lambda_c$, a by-passing transmission channel travelling transparently along all nodes along the section of said ring comprised between said node (n) and said intermediate node (j); and transporting a protocol data unit (PDU) between any node (n) and any destination node (p) using a plurality of direct routes.

17. A method as claimed in claim 16, wherein said step of transporting comprises:

(a) providing a storage means at each said node (n) of said ring network for storing said PDU;

(b) determining the address of said PDU and allocating a wavelength $\lambda$ for transmission of said PDU;

(c) at said node (n), extracting said PDU from said storage means and self-routing said PDU from said node (n) to an intermediate node (j), along one of said direct and by-passing transmission channel of said wavelength $\lambda$, and storing said PDU in said respective storage means at said intermediate node (j);

(d) deleting said PDU from said storage means at said node (n), if said PDU has been delivered without collision;

(e) at said intermediate node (j), determining the address of said PDU, extracting said PDU from said respective storage means and further self-routing said PDU from said intermediate node (j) to one of a further intermediate node (j+1) and said destination node (p) along a further channel of said wavelength $\lambda$; and (f) if said further intermediate node (j+1) is not said destination node (p), repeating steps (d) and (e) until said PDU arrives at said destination node (p).

18. A method as claimed in claim 17, wherein at step (e), said PDU is re-placed in said storage means of said intermediate node (j), if said further channel of wavelength $\lambda$ is not free.

19. A method as claimed in claim 16, wherein said step of transporting comprises:

(a) providing a storage means at each said node (n) of said ring network for storing said PDU;

(b) determining a route index (RI) for said PDU, said RI representing the number of nodes between said destination node (p) and said node (n);

(c) at node (n), locating a free transmission channel of a wavelength $\lambda_k$, and determining a path index for said free transmission channel, and updating said RI according to said path index;

(d) at node (n), extracting said PDU from said storage means and self-routing said PDU from said node (n) to an intermediate node (j) along said free transmission channel of a wavelength $\lambda_k$, and storing said PDU in said storage means at said intermediate node (j);

(e) at said intermediate node (j), locating a further free transmission channel of a wavelength $\lambda_{k+1}$ and determining a further path index for said further free transmission channel, and updating said RI according to said further path index;

(f) extracting said PDU from said storage means of said intermediate node (j) and self-routing said PDU from said intermediate node (j) to one of a further intermediate node (j+1) and said destination node (p), along said further free transmission channel, and storing said PDU at said storage means of said further intermediate node (j+1), if said further intermediate node (j+1) is not said destination node (p); and (g) repeating steps (e) to (g) until said RI indicates that said PDU arrived at said destination node (p).

20. A traffic node for use in an optical wavelength bypassed ring network (WBRN) configured with a plurality (N) of such traffic nodes in a ring configuration, where n is the sequential position of said node (n) in said ring and n∈[1, N], node (n) comprising:

an input port for receiving ($Q_i$) incoming channels and separating same into a first subset of drop channels and a third subset of passthrough channels according to their wavelength;

an output port for providing ($Q_o$) outgoing channels including a second subset of locally generated channels and said third subset of passthrough channels; and bypass means for directly connecting said third subset of passthrough channels from said input port to said output port, where $Q_i$ and $Q_o \geq 2$.

21. A traffic node as claimed in claim 20 further comprising:

a local receiver unit for decoding information received over a drop channel of said first subset recognized by the wavelength and terminating said drop channel; and a local transmitter unit, for encoding information addressed to a destination node (p) of said WBRN and inserting same over an add channel of said second subset, originating at said node (n).

22. A method of routing traffic in an optical ring network configured with a plurality (N) of traffic nodes in a ring configuration, where n is the sequential position of said node (n) in said ring and n∈[1, N], said method comprising the steps of:

providing a set of transmission channels of different wavelengths;

assigning a distinct first subset of drop channels and a distinct second subset of add channels to each said node (n) for carrying traffic between particular nodes of the network; and connecting said node (n) with a destination node (p) along one of a direct route and a bypass route, a bypass route bypassing all intermediate nodes between said node (n0 and said none (p).

* * * * *